United States Patent [19]

Berghuis et al.

[11] Patent Number: 5,348,798
[45] Date of Patent: Sep. 20, 1994

[54] METHOD OF MAKING A HOLLOW CORE STRUCTURAL MEMBER

[75] Inventors: Albert H. Berghuis, Shelby, N.C.; Richard C. McKechnie, Bergen op Zoom; Albert Drenth, Tholen, both of Netherlands

[73] Assignee: Azdel, Inc., Shelby, N.C.

[21] Appl. No.: 968,887

[22] Filed: Oct. 30, 1992

[51] Int. Cl.$^5$ ............................................. B32B 15/00
[52] U.S. Cl. .................................. 428/285; 428/280; 428/284; 428/902; 428/408; 264/258; 264/317
[58] Field of Search ............... 428/284, 902, 285, 280; 264/258, 317

[56] References Cited

U.S. PATENT DOCUMENTS 4,749,613  6/1988  Yamada et al. ..................... 428/286

Primary Examiner—James J. Bell
Attorney, Agent, or Firm—Ralph H. Dougherty

[57] ABSTRACT

An improved method for forming a hollow core structural member, such as an automotive bumper beam, from moldable plastic sheets, such as fiberglass reinforced plastic sheets, by providing a press having a desired shape on the opposing members of the press, placing opposed sheets in the press with a layer of frozen, meltable material, such as ice, in place between them, forming the sheets into the desired article configuration in the press, removing the formed member from the press, then melting and removing the meltable material from the interior of the formed member.

13 Claims, 2 Drawing Sheets

METHOD OF MAKING A HOLLOW CORE STRUCTURAL MEMBER

FIELD OF THE INVENTION

The present invention relates to a method and apparatus for making a hollow core thermoplastic composite structural member, and more particularly to methods for production of a hollow core beam, such as an automotive bumper beam from composite fiber-reinforced thermoplastic resin stampable sheets.

BACKGROUND OF THE INVENTION

For decades, automotive bumpers have been made of metal, and are usually supported by one or several shock-absorbing support members, usually of steel. Every pound of weight in a vehicle increases its gasoline consumption. Thus, it is desirable to provide an automotive component of lighter weight than heretofore possible. In the past few years, bumper beams have been developed from composite fiber-reinforced thermoplastic resin stampable sheets, which have met with acceptance in the industry.

DESCRIPTION OF RELATED ART

Yamada U.S. Pat. No. 4,749,613 teaches a composite fiber reinforced thermoplastic resin stampable sheet and method of making a bumper beam therefrom. However, Yamada utilizes an insert of foamed polyurethane between the stampable sheets forming the shell of his beam.

An article in Plastics Technology, December, 1991, entitled Close-Up on 'Lost-Core' A Puzzle with Many Pieces discusses lost core technology and mentions the extreme difficulties in using lost core technology, as well as the emergence of the use of ice.

SUMMARY OF THE INVENTION

The subject invention is a method for producing hollow core beams from moldable plastic sheets, such as fiberglass reinforced plastic sheets, by establishing the final desired shape on the opposing members of a press, and forming opposed sheets in the press with a layer of frozen, meltable material, such as ice, in place between them, then melting and removing the ice.

The present invention is particularly useful for forming bumper beams for automotive vehicles. It is also useful for forming other hollow core members, particularly structural members such as sandwich panels or other multi-cell members.

OBJECTS OF THE INVENTION

The principal object of the invention is to provide an improved method for molding a hollow core structural member.

A further object of this invention is to provide a method of forming a hollow core beam from composite thermoplastic sheets.

Another object of invention is to provide a structural member of light weight with high mechanical strength.

Another object of the invention is to provide a light weight flooring member or sandwich panel having high mechanical strength.

Another object of the invention is to produce a high strength hollow core bumper beam.

BRIEF DESCRIPTION OF THE DRAWINGS

The foregoing and other objects will become more readily apparent by referring to the following detailed description and the appended drawings in which.

DETAILED DESCRIPTION

Figure 1:
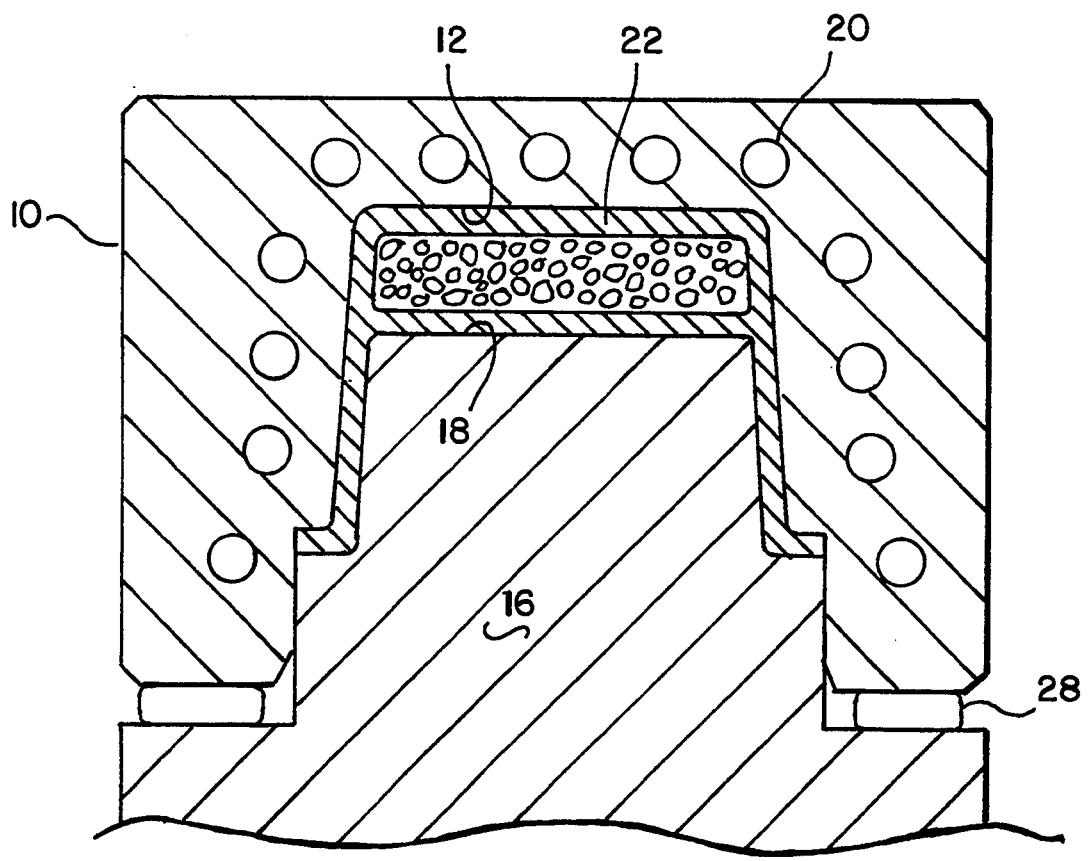
FIG. 1 is a cross-sectional view of a stamping mold with a formed beam between the stamping tools.
Figure 3:
FIG. 3 is an isometric view of a beam product formed by the method of the invention.
Figure 4:
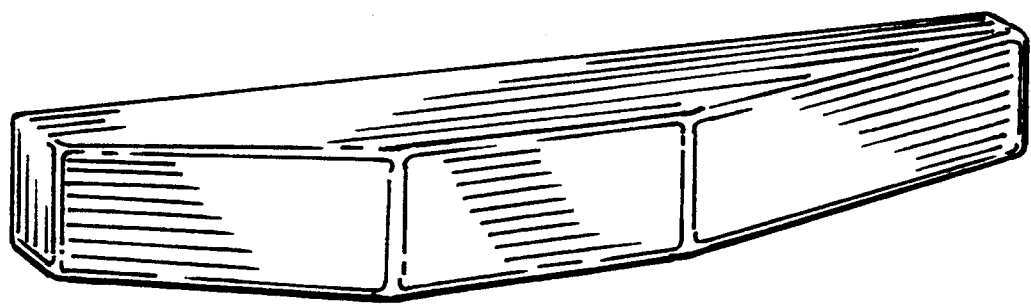
FIG. 4 is an isometric view of an alternative beam product formed by the method of the invention.

Referring now to the drawings, and particularly to FIG. 1, a first mold tool, or stamping mold 10, is provided with a cavity 12 of specific shape. A second mold tool 16 is provided with a specific configuration 18 for mating with the first mold tool. The stamping molds or stamping tools are a pair of platens. The stamping tools or dies have cooling channels 20 therein to remove the heat from the workpieces during the stamping step. The channels 20 in the tools 10, 16 are generally water cooled, preferably with chilled water, to reduce the cycle time of the stamping process.

First and second composite sheets 22 and 24 are placed between the stamping tools, with ice 26 between them, then the tools are brought together rapidly, the composite sheets welding to each other and forming the desired product, with the ice 26 encapsulated between the sheets. A stop 28 can be provided to control the limit of movement of the stamping tools relative to each other, and thus controlling the thickness of the final product.

In operation, a pair of composite fiber-reinforced thermoplastic or thermosetting resin stampable sheets is placed in position for stamping with a meltable material, such as ice, between them.

Figure 2:
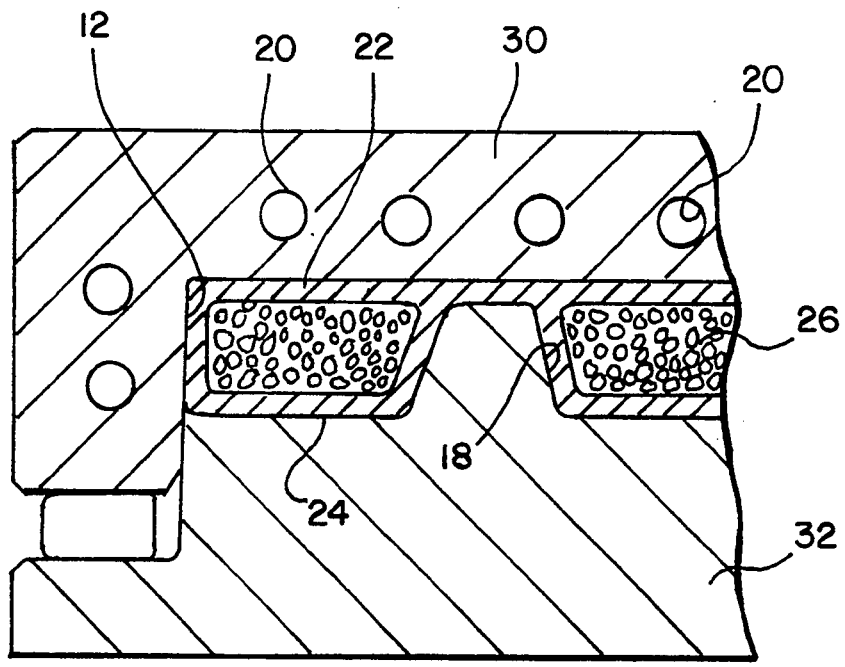
FIG. 2 is a cross-sectional view of a stamping mold with a formed sandwich panel between the stamping tools.

A sandwich panel can be prepared in the same way as shown in FIG. 2. A first mold tool 30 is provided with a cavity 12 of specific shape. A second mold tool 32 is provided with a specific configuration 18 for mating with the first mold tool. The stamping molds or stamping tools are a pair of platens. The stamping tools or dies have cooling channels 20 therein to remove the heat from the workpiece during the stamping step. The channels 20 in the tools 10, 16 are generally water cooled, preferably with chilled water, to reduce the cycle time of the stamping process. Two sheets of a composite material 22 and 24 are set in between the stamping tools, with ice 26, between them. The tools are brought together rapidly fusing the composite materials together in the desired shape. The ice melts later and the water is removed, leaving a hollow structure.

Thermoplastic composites are heated, for example in an infrared oven, prior to being placed between the stamping tools, whereas thermosetting resin composites are heated by the tools themselves. The thermoplastic composite is preheated to the its melting point, and beyond, frequently to 20° or even to 30° C. above the specific thermoplastic melting point. Thus, any meltable thermoplastic resins, including low temperature alloys which are meltable, can be utilized in this process. The criteria is that the melting point of the core material must be lower than the melting point of the resin. Even paraffin can be used as a core material, since it has a low melting point. Preferably there should be at least 50° C. difference in melting point between the thermoplastic composite and the core material. Polypropylene has a generally lower melting point as a thermoplastic resin, whereas nylons, thermoplastic PET and polyester resins have a much high melting point. Thus the meltable core material can be varied according to the melting point of the resins or composites or composite resins.

Glass fiber reinforced thermoplastic resin stampable sheets are placed in the stamping press with ice. The two sheets flow together without any weld line, forming a single composite.

After removal from the stamping press, a small outlet or drain hole is placed in the formed member at a location where it will not show in the finished product. The melted material is then allowed to flow out of each formed cell of the stamped member.

For sandwich panels, precast blocks or cubes of ice may be formed into shapes such as rectangular parallelopipeds, including cubes or other polyhedrons, frustums of pyramids or cones or the like. They may be evenly spaced in a particular pattern, if desired. Upper and lower stampable sheets are then pressed together with the ice between them. Bags of ice in any form, including crushed forms, may be substituted for the ice blocks.

Suitable thermoplastic resins for the inventive process are polyesters, PETs, PPTs, polybuthylene teraphthalate (PBT) or alloys, XENOY ®, NORYL ®, LEXAN ® and other thermoplastics, polyvinylidene fluoride polymer, and the family of polyethylene thermoplastic resins. Other suitable thermoplastic material can be selected from the group consisting of polypropylene (PP), polyethylene (PE), ultra high molecular weight polyethylene (UHMW PE), ethylene chlorotrifluoroethylene (ECTFE), ethylene tetrafluoroethylene (ETFE), polyvinylidene fluoride (PVDF), chlorotrifluoroethylene (CTFE), fluorinated ethylene propylene (FEP), perfluoroalkoxy (PFA), acrylonitrile-butadiene-styrene (ABS), polyvinylchloride, chlorinated polyvinylchloride (CPVC), vinyl ester, epoxy, polyphenylene sulfide (PPS), polyphthalamide (PPA), polysulfone, vinyl acetate, acrylonitrile, polystyrene, styrene, polycarbonates, polytetrafluoroethylene (PTFE), chlorine sulphonyl polyethylene (CSP), perfluoro (ethylenepropylene) copolymer (FEP), and ethylene/chlorotrifluoroethylene copolymer (ECTFE). This list is not meant to be either limiting or exhaustive, but merely illustrative of the wide range of homopolymeric and copolymeric materials which are suitably used in the method of the present invention.

Suitable fibers are glass fibers, carbon fibers, aramid fibers, polyamide fibers, or polyester fibers.

Suitable thermosetting resins are unsaturated polyesters, epoxys, or polyurethanes.

The thermoplastic or thermosetting resin and fiber are formed into a stampable sheet by laminating methods, then are expanded by heating. For thermosetting composites, the platens are heated to a range of about 200–350 C.

Although considerably more expensive, dry ice can be utilized in place of frozen water, as the carbon dioxide will sublime and not leave any residual water.

EXAMPLE

A bumper beam is formed from fiberglass reinforced thermoplastic composite sheets wherein the thermoplastic is NORYL, a polyphenylene, oxide-based thermoplastic made by GE Plastics. A pair of composite sheets are preheated to about 25 C. above the melting temperature of the thermoplastic in an infrared oven. Thereafter the sheets are placed in a stamping mold with plastic bags of ice between them, and pressed together. The heated sheets weld together to form a molded bumper beam. Then the ice is melted and removed from the interior of the beam to form a hollow core beam.

SUMMARY OF THE ACHIEVEMENT OF THE OBJECTS OF THE INVENTION

From the foregoing, it is readily apparent that we have invented an improved method for molding a hollow core structural member, such as a hollow core beam, flooring member, or sandwich panel, from reinforced composite plastic sheets. The structural member has light weight with high mechanical strength.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for making a lightweight hollow core structural member, comprising:
   providing a mold having opposed mold tools, each having a desired configuration;
   heating two composite, fiber-reinforced stampable sheets selected from the group consisting of thermoplastic and thermosetting resins;
   placing the sheets in the mold with a meltable material between them;
   pressing the sheets together in the mold by pressing the opposed mold tools together to form a structural member with the meltable material between the sheets;
   removing the structural member from the mold; and
   melting and removing the meltable material to form the hollow core member.

2. A method according to claim 1, wherein the meltable material has a melting point at least 50° C. lower than the melting point of the resin in the composite sheets.

3. A method according to claim 1, wherein the meltable material is selected from the group consisting of ice ($H_2O$), dry ice ($CO_2$), and paraffin.

4. A method according to claim 1, wherein the sheets include thermoplastic resins selected from the group consisting of polyesters, PETs, PPTs, polybuthylene teraphthalate (PBT) or alloys, XENOY ®, NORYL ®, LEXAN ® and other thermoplastics, polyvinylidene fluoride polymer, the family of polyethylene thermoplastic resins, polypropylene (PP), polyethylene (PE), ultra high molecular weight polyethylene (UHMW PE), ethylene chlorotrifluoroethylene (ECTFE), ethylene tetrafluoroethylene (ETFE), polyvinylidene fluoride (PVDF), chlorotrifluoroethylene (CTFE), fluorinated ethylene propylene (FEP), perfluoroalkoxy (PFA),acrylonitrile-butadiene-styrene (ABS)-,polyvinylchloride, chlorinated polyvinylchloride (CPVC), vinyl ester, epoxy, polyphenylene sulfide (PPS), polyphthalamide (PPA), polysulfone, vinyl acetate, acrylonitrile, polystyrene, styrene, polycarbonates, polytetrafluoroethylene (PTFE), chlorine sulphonyl polyethylene (CSP), perfluoro (ethylenepropylene) copolymer (FEP), and ethylene/chlorotrifluoroethylene copolymer (ECTFE).

5. A method according to claim 1, wherein the sheets include thermosetting resins selected from the group consisting of unsaturated polyesters, epoxys, or polyurethanes.

6. A method according to claim 1, wherein the fibers are selected from the group consisting of glass fibers, carbon fibers, aramid fibers, polyamide fibers, and polyester fibers.

7. A method according to claim 1, wherein the sheets are laminates.

8. A method according to claim 5, wherein the mold comprises mating heated platens.

9. A method according to claim 4, further comprising preheating the composites to a temperature in the range defined by the melting point of the thermoplastic resin to 30° C. above the melting point of the thermoplastic resin.

10. An automotive bumper beam article produced according to claim 1.

11. A hollow core structural member produced according to claim 1.

12. A sandwich panel article produced according to claim 1.

13. A multi-cell structural member produced according to claim 1.

* * * * *